May 26, 1970      D. M. MONTGUIRE      3,513,743

MULTIPLE-HEAD SLITTING APPARATUS

Filed Aug. 21, 1967      3 Sheets-Sheet 1

INVENTOR
DAVID M. MONTGUIRE

Shanley & O'Neil
ATTORNEYS

INVENTOR
DAVID M. MONTGUIRE

May 26, 1970     D. M. MONTGUIRE     3,513,743
MULTIPLE-HEAD SLITTING APPARATUS
Filed Aug. 21, 1967     3 Sheets-Sheet 3
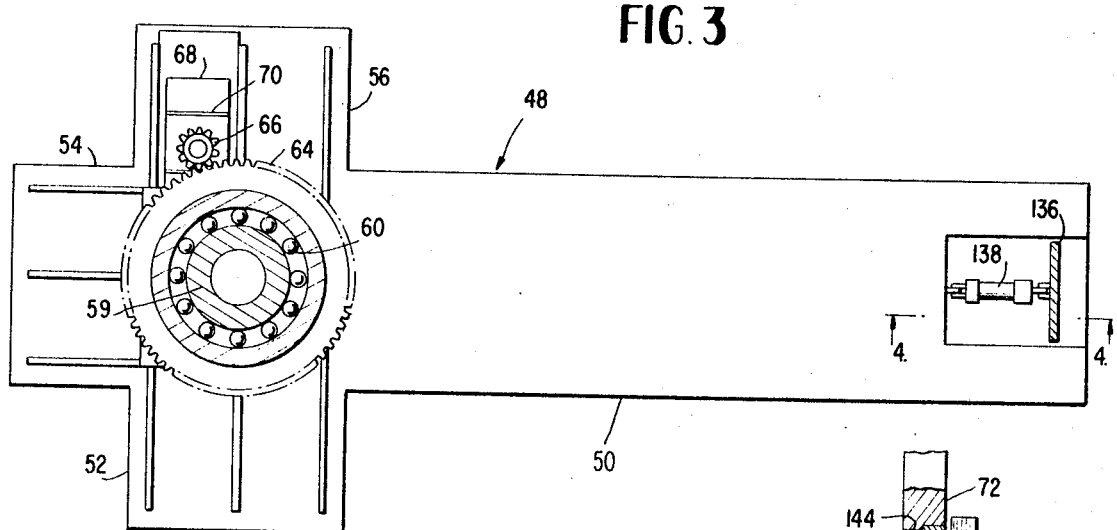
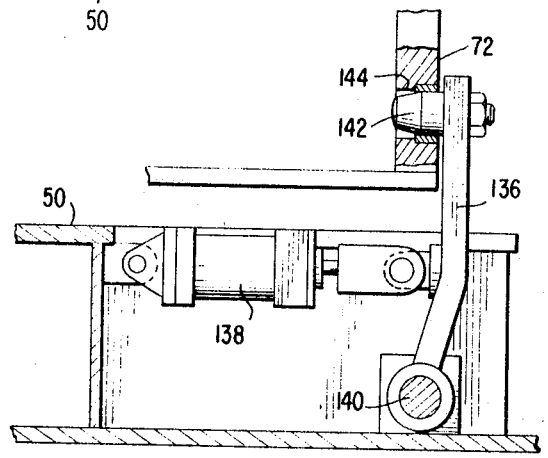
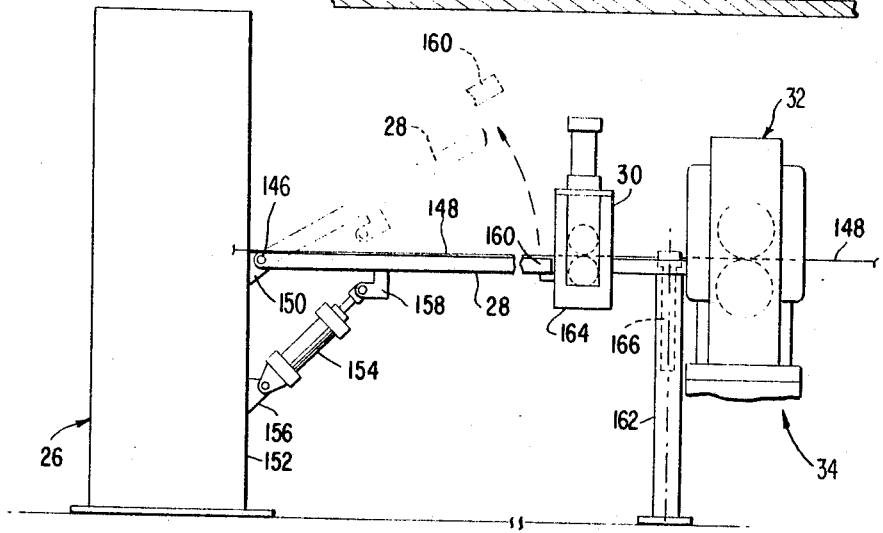
INVENTOR
DAVID M. MONTGUIRE
BY Shanley & O'Neil
ATTORNEYS

United States Patent Office 3,513,743
Patented May 26, 1970

3,513,743
MULTIPLE-HEAD SLITTING APPARATUS
David M. Montguire, Elm Grove, Wis., assignor to National Steel Corporation, a corporation of Delaware
Filed Aug. 21, 1967, Ser. No. 662,061
Int. Cl. B23d *19/06;* B26d *1/16*
U.S. Cl. 83—433                                12 Claims

ABSTRACT OF THE DISCLOSURE

Slitting apparatus includes a plurality of slitter heads carried by a turntable. The turntable is mounted for rotation about a stationary column which carries a drive unit. While one slitter head is operated by the drive unit to slit material at a slitting station, the other slitter heads are at servicing stations. Rotation of the turntable positions any selected slitter head at the slitting station. A feed table and an entry pinch roll assembly are provided along a pass line to the slitting station. The feed table and pinch roll assembly are movable out of the path of rotation of the turntable and slitter heads to avoid interference with rotation of the turntable. An aligning mechanism assures accurate alignment of a slitter head at the slitting station.

BACKGROUND OF THE INVENTION

Thin, flat products of steel and other metallic and non-metallic materials are often mass-produced in the form of strip of relatively great width. Frequently, customers require strip of relatively narrower width, and the as-produced strip must be slit into narrower strips. This is usually accomplished by passing the wide strip through a slitter head including arbors carrying rotary slitting knives spaced along the length of the arbors a distance corresponding to the width of the desired product.

The slitting knives can be placed on the arbors at any desired location, but setting up the arbors (i.e., positioning the knives on the arbors to slit strip into particular desired widths) is time-consuming and requires that the slitting apparatus be shut down. Loss of production caused by downtime for setting-up is disadvantageous in any event, and can become a serious handicap when a multiplicity of small orders for different widths is to be processed.

Accordingly, a main object of the invention is the provision of improved slitting apparatus which minimizes downtime for setting-up or other servicing.

Another object of the invention is the provision of novel, multiple-head, slitting apparatus in which one slitter head is operating at a slitting station while another is serviced at a servicing station, and the preserviced slitter head then moved to the slitting station.

Still another object of the invention is the provision of novel, multiple-head slitting apparatus in which a plurality of slitter heads are carried by a rotatable member which positions a selected slitter head at a slitting station, and another slitter head at a servicing station.

A further object of the invention is the provision of novel multiple-head slitting apparatus including apparatus for delivering strip to be slit to the slitting station.

Other objects of the invention, its features and advantages, will appear from the following detailed description which, when considered in connection with the accompanying drawings, discloses a preferred embodiment of the invention for purposes of illustration only. For determining the scope of the invention, reference will be made to the appended claims.

BRIEF DESCRIPTION OF THE DRAWINGS

In the drawings, wherein similar reference characters denote similar elements throughout the several views:
FIG. 3 is a view taken on section line 3—3 of FIG. 2;
FIG. 4 is a cross-sectional view taken on line 4—4 of FIG. 3;
and
FIG. 5 is a cross-sectional view taken on line 5—5 of FIG. 1.

DESCRIPTION OF THE PREFERRED EMBODIMENT

Figure 1:
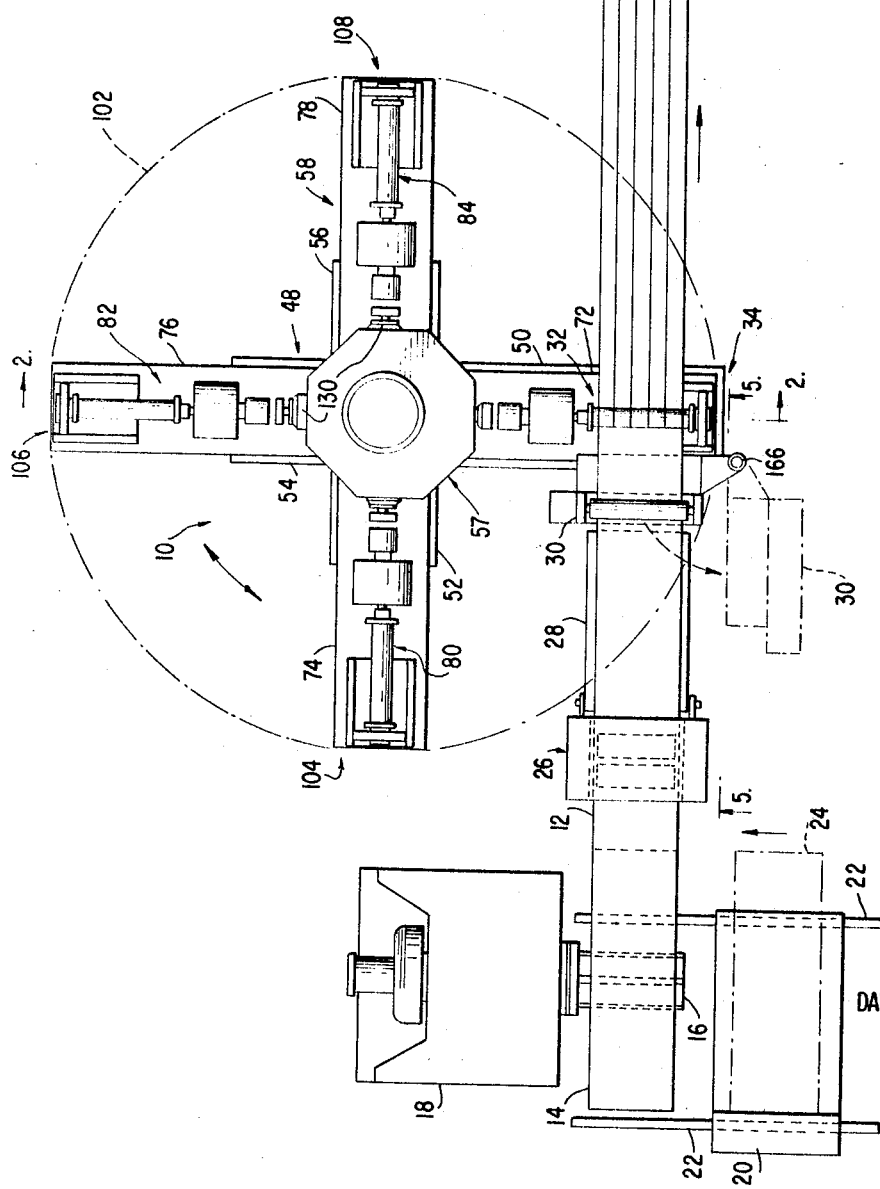
FIG. 1 is a plan view of apparatus forming a preferred embodiment of the invention.

In FIG. 1, multiple-head slitting apparatus generally indicated at 10 is shown slitting a wide strip 12 into a plurality of segments of relatively narrower width. Strip 12 is uncoiled from a coil 14 mounted on mandrel 16, which is driven by motor 18 in a conventional manner. Coil car 20, movable along rails 22, is disposed to supply another coil 24, shown in dotted lines, to mandrel 16 upon exhaustion of coil 14, in a fashion well known in the art. Strip 12 passes sequentially through a conventional pinch roll-shear-straightening unit generally indicated at 26, over a feed table 28 and through entry pinch roll assembly 30. Strip 12 is slit into a plurality of narrow segments by a slitter head, generally indicated at 32, which is positioned at a slitting station generally indicated at 34. The slit strip is recoiled into a coil 35 on mandrel 36 of conventional double-head recoiler 38, which is driven by motor 40 through speed reducer and clutch assembly 42 in a conventional manner. When all of strip 12 is recoiled, recoiler 38 is rotated to position mandrel 36 in the position occupied by mandrel 36' in FIG. 1. Mandrel 36 is extended in a conventional manner to deposit coil 35 on the usual downender 44, for discharge across rollers 47 in the direction of arrow 46.

Figure 2:
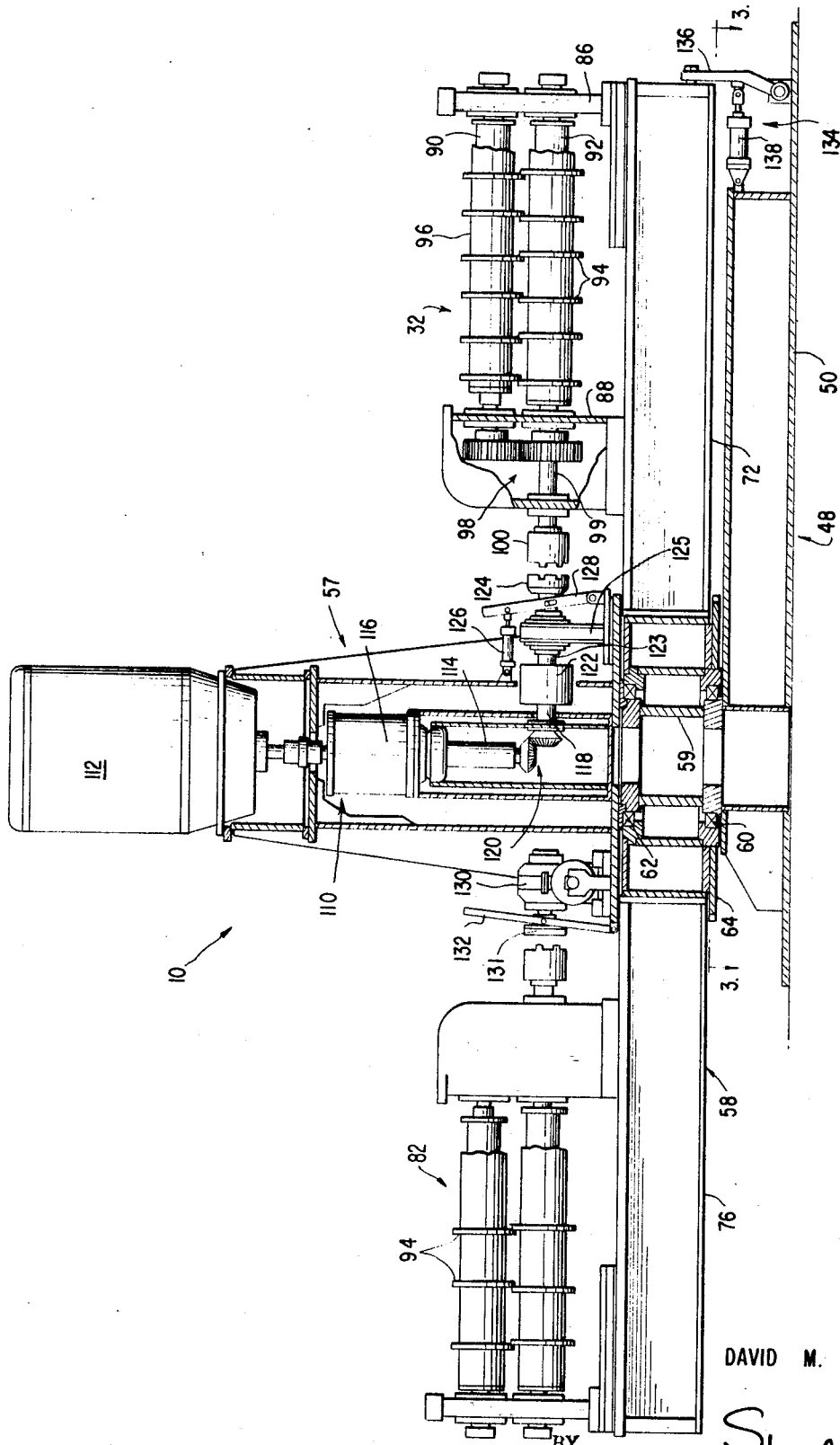
FIG. 2 is a cross-sectional view taken on line 2—2 of FIG. 1.

Multiple-head slitting apparatus 10 is mounted on a generally cross-shaped base generally indicated at 48 (see also FIGS. 2, 3). Base 48 includes a long leg 50, which extends in a direction towards slitting station 34, and three shorter legs 52, 54, 56. A stationary member or column, generally indicated at 57 and including a shaft portion 59, projects upwardly from base 48. A generally X-shaped rotatable member or turntable generally indicated at 58 is carried by base 48. Turntable 58 is mounted for rotational movement in a generally horizontal plane on the shaft 59 by annular ball bearings 60, 62. Turntable 58 includes a ring gear 64 which meshes with a drive pinion 66 (FIG. 3) which is driven by motor 68 through speed reducer 70 to rotate turntable 58 about column 57.

Turntable 58 includes four arms 72, 74, 76, 78, each carrying a slitter head. The slitter heads are generally indicated at 32, 80, 82, and 84, respectively. The arms extend radially relative to column 57, and each arm extends generally perpendicularly relative to adjacent arms. For example, arm 72 extends generally perpendicularly with respect to arms 74, 78. The slitter heads are identical except as to the number and positioning of slitting knives, as will be discussed hereinafter, and a description of one slitter head will impart understanding of all. For example, slitter head 32 includes a pair of opposed, spaced-apart upstanding frame members 86, 88 (see FIG. 2) mounted on arm 72. A pair of rotary slitting arbors 90, 92 are journaled in the frame members. The arbors carry rotary knives 94 which are spaced axially along the arbors. The knives 94 coact in a conventional manner to shear material passed between the arbors. The knives on each arbor are separated from one another by spacers 96, as is conventional. Arbors 90, 92 are driven in rotational movement through a power transmision including gearing 98, shaft 99, and a driven dog 100, when dog 100 is engaged with a drive unit described hereinafter.

The number and location of knives on a slitter head vary in accordance with the width to which product is desired to be slit. In FIG. 2, slitter head 32 is set up to slit incoming strip into five segments of given width. Six pairs of coacting knives are employed for this purpose, with the two pairs of knives at the ends of the arbors functioning to trim the edges of the strip. Slitter head 82 is set up to slit strip into two segments of another given width, employing three pairs of coacting knives. As indicated above, the changing of a slitter head from one set-up to another is a time-consuming task having adverse effects which are minimized in apparatus according to the invention.

Turntable 58 and slitter heads 32, 80, 82, 84 define a path of rotation 102 upon rotation of turntable 58 by motor 68. Slitting station 34, and three servicing stations 104, 106, 108 are located at regular intervals around path 102, so that each station is equidistant from adjacent stations along path 102. For example, station 34 is equidistant from stations 104, 108. The slitter heads are located at regular intervals on turntable 58, each slitter head being spaced from adjacent slitter heads a distance around the path of rotation equal to the spacing between stations. Hence, rotation of turntable 58 to position any slitter head at slitting station 34 simultaneously positions the other three slitter heads at the servicing stations. Thus, while one slitter head is in operation at slitting station 34, set-up or maintenance work can be performed on the other three slitter heads so that downtime on the slitting apparatus for such purposes is minimized.

In the preferred embodiment, four stations and four slitter heads are provided with regular intervals between stations and slitter heads. However, more or fewer stations and slitter heads can be provided, and intervals between stations and between slitter heads may be other than regular, so long as distances between slitter heads correspond to distances between stations along the path of rotation.

The four slitter heads share a common drive unit, generally indicated at 110, which is carried by column 57. Drive unit 110 includes an electric motor 112 which drives shaft 114 through speed reducer 116. In the drive unit, rotary motion is translated from shaft 114 to drive shaft 118 through bevel gearing generally indicated at 120. An overrunning clutch 122, which may be of any suitable type of conventional design, is mounted on column 57 and operatively connected to shaft 118. Clutch 122 is also operatively connected to a drive dog 124 through a shaft 123, which is carried in bearing mount 125. Extension of a hydraulic cylinder 126 moves shifter lever 128 to engage drive dog 124 with the driven dog of the slitter head which is positioned at the slitting station to drive that slitter head. With the parts in the position illustrated in FIG. 2, drive dog 124 engages driven dog 100 of slitter head 32. Disengagement of the drive and driven dogs is effected by retraction of cylinder 126, when it is desired to rotate turntable 58 to position another slitter head at the slitting station.

A plurality of small hydraulic motors 130 are positioned on column 57 so that the slitter heads at the servicing stations can be operated for test purposes. Each motor 130 includes a drive dog 131 which is engaged with a driven dog on the slitter head at the respective servicing station by manual operation of a shift lever 132, when it is desired to rotate the arbors for purposes of testing the slitter head. In the preferred embodiment, the test motors 130 are fixed in position on column 57, but other arrangements could be utilized.

Multiple-head slitting apparatus 10 includes an aligning mechanism generally indicated at 134 (see FIGS. 2, 4) which accurately aligns the rotatable member with a selected slitter head in position at the slitting station. Aligner 134 includes a swingable member or plate 136 which is pivotally connected to leg 50 of base 48 at slitting station 34. A hydraulic cylinder 138, pivotally connected at its ends to leg 50 and plate 136, respectively, pivots plate 136 about pivot pin 140 which is journaled in leg 50. A projection or pin 142 is secured to plate 136 at the upper central portion of the plate. Pin 142 has a generally circular cross-sectional configuration closely conformed to the configuration of a recess 144, which is formed in arm 72 of turntable 58 adjacent slitter head 32. When turntable 58 is rotating, hydraulic cylinder 138 is extended so that pin 142 is spaced away from the path of rotation. When the slitter head 32 is positioned at the slitting station, the turntable is operated to bring projection 142 and recess 144 roughly into opposition. Hydraulic cylinder 138 is retracted to draw pin 142 into the recess to accurately align the slitter head 32 at the slitting station. A tapered head portion on pin 142 facilitates insertion of the pin into the recess.

Recesses similar to recess 144 are formed in turntable arms 74, 76, 78, adjacent the respective slitter heads. Pin 142 is positioned on the base, and the recesses are positioned on the turntable at locations such that, when the projection is received in a recess, the corresponding slitter head is accurately positioned at the slitting station.

Feed table 28 (see FIGS. 1, 5) delivers material to be slit along a pass line 148 to slitting station 34. Feed table 28 is mounted for movement about a generally horizontal pivot axis 146 by a pair of brackets 150 which are carried by frame 152 of pinch roll-shear-straightening unit 26. Axis 146 is spaced along pass line 148 from slitting station 34, out of the path of rotation 102 of the turntable and slitter heads. A hydraulic cylinder 154 is pivotally mounted at one end by a bracket 156 on frame 152, and at the other end by a bracket 158 on feed table 28. With table 28 in the solid line position of FIG. 5, free end 160 of table 28 is adjacent slitting station 34 and the surface of the table is on a level with pass line 148, so that strip is fed from unit 26 to entry pinch roll assembly 30 and slitter head 32. However, in such position, a portion of the table 28 is in the path of rotation 102, and the turntable cannot be rotated. Extension of hydraulic cylinder 154 pivots table 28 about axis 146 to the dotted line position of FIG. 5, in which all portions of table 28 are out of the path of rotation 102, and end 160 is spaced away from slitting station 34 and elevated above pass line 148. With feed table 28 in the elevated position, turntable 58 can be rotated without interference from the feed table.

Entry pinch roll assembly 30, located at the entry side of slitting station 34, is mounted on an upstanding cylindrical stand 162 which is positioned out of the path of rotation 102. Roll assembly 30 is carried on a base 164. Base 164 is pivotally mounted on a pin 166 in stand 162 for swinging movement in a horizontal plane between the solid and dotted line positions of FIG. 1. In the solid line position, the nip of the rolls of pinch roll assembly 30 is in the pass line 148 (see FIG. 5), but the assembly 30 is in the path of rotation 102 and the turntable cannot be rotated. However, by manually swinging the roll assembly to the dotted line position of FIG. 1, the assembly 30 is moved out of the path of rotation 102 and the turntable 58 can be rotated without interference by the pinch roll assembly. Except for the pivotal mounting arrangement just described, entry pinch roll assembly 30 is completely conventional.

In operation, a selected slitter head is set up at one of the servicing stations 104, 106, 108 while another is in operation slitting material at slitting station 34. Dog 124 is disengaged from the operating slitting head and cylinder 138 extended to withdraw pin 142 from the recess adjacent the operating slitting head. Cylinder 154 is extended to elevate feed table 28, and pinch roll assembly 30 is moved aside. The turntable is rotated to position the selected slitter head at slitting station 34, and cylinder 138 retracted to insert pin 142 into the recess adjacent the selected slitter head. Entry pinch roll assembly 30 is moved into position, and cylinder 154 is retracted to lower feed table 28. Dog 124 is engaged to drive the selected slitter, and slitting is resumed. Since clutch 122 is an overrunning clutch, if desired, slitter drive motor 112 may be deenergized after threading of the strip through the slitter head and onto mandrel 36, and the strip then pulled through the slitter head by recoiler drive motor 40. In this mode of operation, which does not provide so fine an edge as when slitter drive motor 112 is operating, the knives are rotated by action of the strip being pulled therethrough. The overrunning clutch permits the arbors to rotate while shaft 118 is stationary, without necessity for disengaging dog 124.

Apparatus according to the invention is highly advantageous. With the provision of a multiplicity of slitter heads on a rotatable turntable which carries the slitter heads between servicing and slitting stations, downtime and loss of production are minimized because setting-up and maintenance work can be performed on one slitter head while another is operating, and interchanging of slitter heads is effected in a short time. Provision of an arrangement whereby a common drive unit is used to operate any slitter head is highly advantageous in reducing the cost of the apparatus, since the drive unit need only be of a size sufficient to power one slitter head and only one drive unit need be employed. Provision of a movable feed table and a movable entry pinch roll assembly permits the advantageous use of such devices with multiple-head slitter apparatus without interference with its operation. The apparatus is highly flexible since slitter heads with particular setups can be stored at a servicing station, then quickly moved into position when desired.

Although the invention has been described in connection with a preferred embodiment, modifications of the preferred embodiment can be made without departing from the invention. Such modifications are within the scope of the appended claims.

I claim:

1. Multiple-head slitting apparatus, comprising
a base,
a plurality of power-drivable slitter heads,
mounting means for mounting the slitter heads on the base for movement about a common axis in a path of rotation in a generally horizontal plane,
a slitting station and a servicing station spaced from one another a distance along the path of rotation,
means for transporting material to be slit along a pass line having opposite sides and extending through the slitting station,
each slitter head including a plurality of elongated slitting arbors supported at opposite end portions and extending across the pass line from a location contiguous to one side of the pass line to a location contiguous to the other side of the pass line,
means for rotating the slitter heads about the common axis in the path of rotation in the generally horizontal plane to position a selected slitter head at the slitting station and another slitter head at the servicing station,
driving means for power driving the selected slitter head at the slitting station.

2. The multiple-head slitting apparatus of claim 1, including
a stationary member projecting upwardly from the base,
the mounting means including a rotatable member mounted for rotational movement about the stationary member,
the driving means being carried by the stationary member and the slitter heads being carried by the rotatable member.

3. The multiple-head slitting apparatus of claim 2, the rotatable member including a plurality of arms extending radially relative to the stationary member,
each of the slitter heads being carried by an arm.

4. The multiple-head slitting apparatus of claim 3, including
one slitting station and three servicing stations, each station being equidistantly spaced from adjacent stations around the path of rotation,
the rotatable member having four arms, each arm carrying a slitter head and extending generally perpendicularly relative to adjacent arms,
each slitter head being spaced from adjacent slitter heads a distance around the path of rotation equal to the distance between stations.

5. The multiple-head slitting apparatus of claim 2, each slitting arbor being mounted for rotational movement,
each slitter head including power transmission means for transmitting power from the driving means on the stationary member to the arbors to rotate the arbors, and
the multiple-head slitting apparatus including means carried by the stationary member for engaging the driving means with the power transmission means of the selected slitter head, and for disengaging the driving means from the power transmission means of the selected slitter head.

6. The multiple-head slitting apparatus of claim 5, the driving means including overrunning clutch means for permitting operation of the power transmission means of the selected slitter head with the driving means inoperative to drive the selected slitter head and with the driving means engaging the power transmission means of the selected slitter head.

7. The multiple-head slitting apparatus of claim 2, including
motor means carried by the stationary member for test-driving the other slitter head at the servicing station.

8. The multiple-head slitting apparatus of claim 1, including
table means for delivering material to be slit along the pass line to the slitting station,
the table having an upper surface,
second mounting means for movably mounting the table means, and
means for moving the table means between
a first position in which the upper surface of the table means is on a level with the pass line with at least a portion of the table means in the path of rotation and one end portion of the table means adjacent the slitting station, and
a second position in which all portions of the table means are out of the path of rotation and the one end portion of the table means is spaced away from the splitting station.

9. The multiple-head slitting apparatus of claim 8, the second mounting means including means mounting the table means for movement about a generally horizontal pivot axis spaced along the pass line from the slitting station and out of the path of rotation,
the one end portion of the table means being elevated above the pass line in the second position of the table means.

10. The multiple-head slitting apparatus of claim 1, the slitting station having an entry side,
the multiple-head slitting apparatus including
a pinch roll assembly disposed on the entry side of the slitting station, and
means mounting the pinch roll assembly for movement between
a first position in which the pinch roll assembly is in the path of rotation and in the pass line, and a second position in which the pinch roll assembly is out of the path of rotation and out of the pass line.

11. Multiple-head slitting apparatus, comprising
a base,
a plurality of power-drivable slitter heads,
mounting means for mounting the slitter heads on the base for movement in a path of rotation in a generally horizontal plane,
a slitting station and a servicing station spaced from one another a distance along the path of rotation,
means for rotating the slitter heads in the generally horizontal plane to position a selected slitter head at the slitting station and another slitter head at the servicing station,
driving means for power driving the selected slitter head at the slitting station, and
aligning means for aligning the selected slitter head in position at the slitting station,
the aligning means including
means forming a recess in the mounting means,
a projecting member movably mounted on the base and having a configuration conformed to the configuration of the recess, and
motive means for moving the projecting member into the recess when the selected slitter head is positioned at the slitting station.

12. The multiple-head slitting apparatus of claim 11,
the recess being located adjacent the selected slitter head,
the projecting member being carried by a swingable member pivovtally connected to the base adjacent the slitting station,
the motive means including means associated with the base for pivotally moving the swingable member between a first position in which the projecting member is received in the recess, and a second position in which the projecting member is withdrawn from the recess.

References Cited
UNITED STATES PATENTS

| | | | |
|---|---|---|---|
| 1,424,309 | 8/1922 | Johnson | 83—492 X |
| 2,958,248 | 11/1960 | Renard | 83—433 X |
| 3,260,146 | 7/1966 | Child | 83—479 |

ANDREW R. JUHASZ, Primary Examiner

J. F. COAN, Assistant Examiner

U.S. Cl. X.R.

83—479, 500, 552